United States Patent
Ota et al.

(10) Patent No.: US 9,252,699 B2
(45) Date of Patent: Feb. 2, 2016

(54) CONTROL DEVICE AND CONTROL METHOD FOR VEHICULAR ROTATING ELECTRIC MACHINE

(71) Applicants: Takashi Ota, Toyota (JP); Youhei Yamada, Kariya (JP)

(72) Inventors: Takashi Ota, Toyota (JP); Youhei Yamada, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 105 days.

(21) Appl. No.: 14/282,445

(22) Filed: May 20, 2014

(65) Prior Publication Data

US 2014/0346979 A1    Nov. 27, 2014

(30) Foreign Application Priority Data

May 21, 2013    (JP) .................. 2013-106953

(51) Int. Cl.
*H02P 21/08*    (2006.01)
*H02P 27/08*    (2006.01)

(52) U.S. Cl.
CPC ............... *H02P 27/08* (2013.01); *H02P 21/08* (2013.01)

(58) Field of Classification Search
CPC ............. B60L 3/0061; H02P 2207/01; H02P 23/0095; H02P 23/08; H02P 27/06; H02P 21/08; H02P 27/08; H02M 7/483; H02M 7/527
USPC ...................... 318/51, 34, 52, 713, 67, 91, 53
See application file for complete search history.

(56) References Cited

U.S. PATENT DOCUMENTS

| | | | | | |
|---|---|---|---|---|---|
| 4,047,083 | A * | 9/1977 | Plunkett | ................ | H02M 7/527 318/807 |
| 6,247,437 | B1 * | 6/2001 | Yamaguchi | ............ | B60K 6/445 123/179.3 |
| 6,742,487 | B2 * | 6/2004 | Yamaguchi | ............ | B60K 6/445 123/179.3 |
| 7,443,116 | B2 * | 10/2008 | Kutsuna | .............. | B60L 11/1803 180/65.1 |
| 7,702,432 | B2 * | 4/2010 | Bandai | ....................... | B60T 1/10 180/65.1 |
| 8,575,778 | B2 * | 11/2013 | Chen | ..................... | B60L 11/123 307/66 |
| 8,674,637 | B2 * | 3/2014 | Kamijo | .................. | B60L 3/003 180/65.1 |
| 2006/0052915 | A1 * | 3/2006 | Sato | ....................... | B60W 10/08 701/22 |
| 2009/0021198 | A1 | 1/2009 | Okamura et al. | | |

FOREIGN PATENT DOCUMENTS

| | | |
|---|---|---|
| JP | 08-289405 A | 11/1996 |
| JP | 2005-354785 A | 12/2005 |
| JP | 2007-259631 A | 10/2007 |
| JP | 2010-130890 A | 6/2010 |
| JP | 2012-228131 A | 11/2012 |

* cited by examiner

*Primary Examiner* — Rita Leykin
(74) *Attorney, Agent, or Firm* — Sughrue Mion, PLLC

(57) ABSTRACT

When a command frequency to a rotating electric machine is included in an inverter lock frequency band, a frequency switching section switches the command frequency to a frequency outside the inverter lock frequency band by changing a slip frequency command value. In response to this, a torque command change section changes a torque command to a second rotating electric machine other than a first rotating electric machine of which the slip frequency is changed such that a torque fluctuation caused by the change of the slip frequency command value is canceled out.

5 Claims, 6 Drawing Sheets

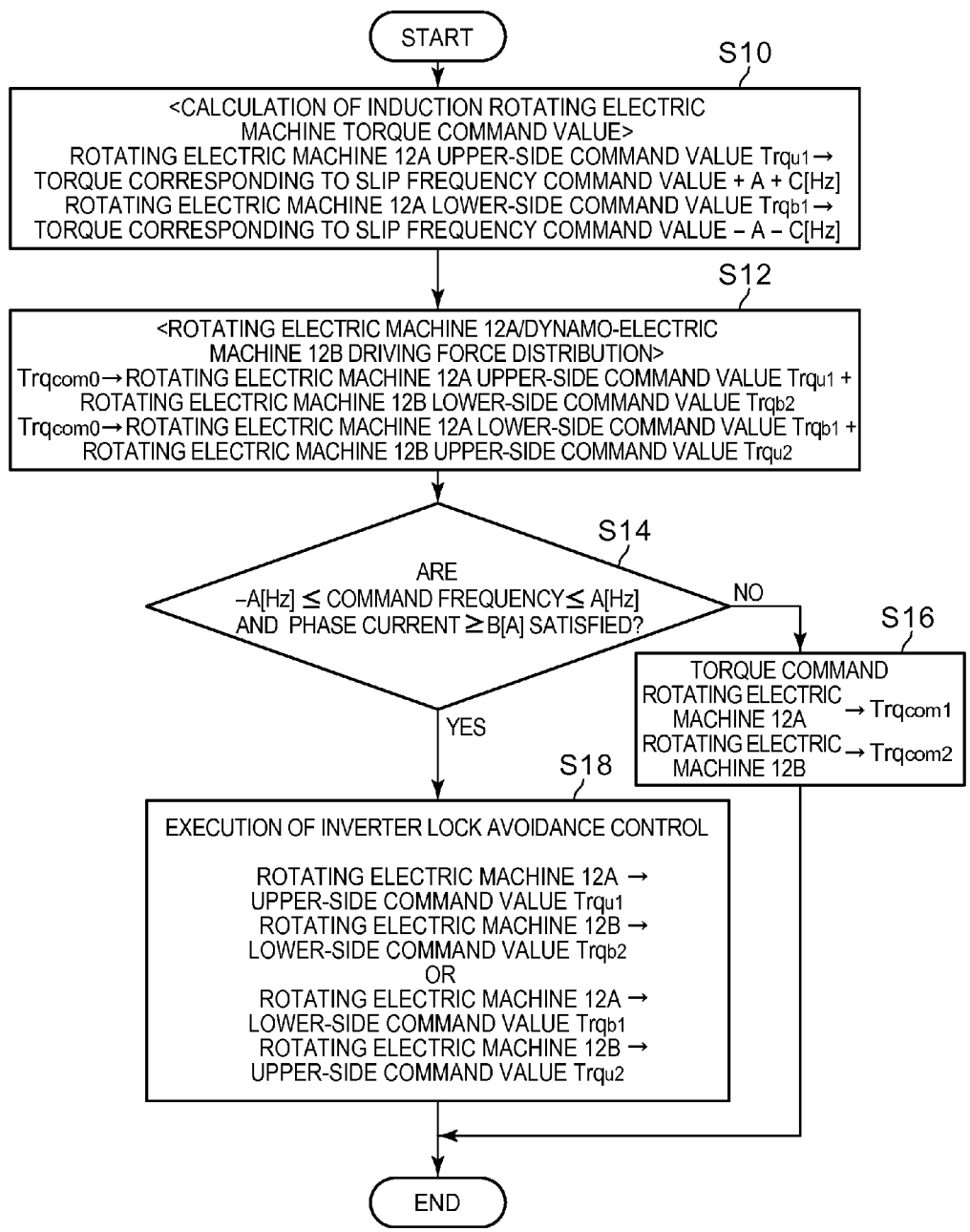

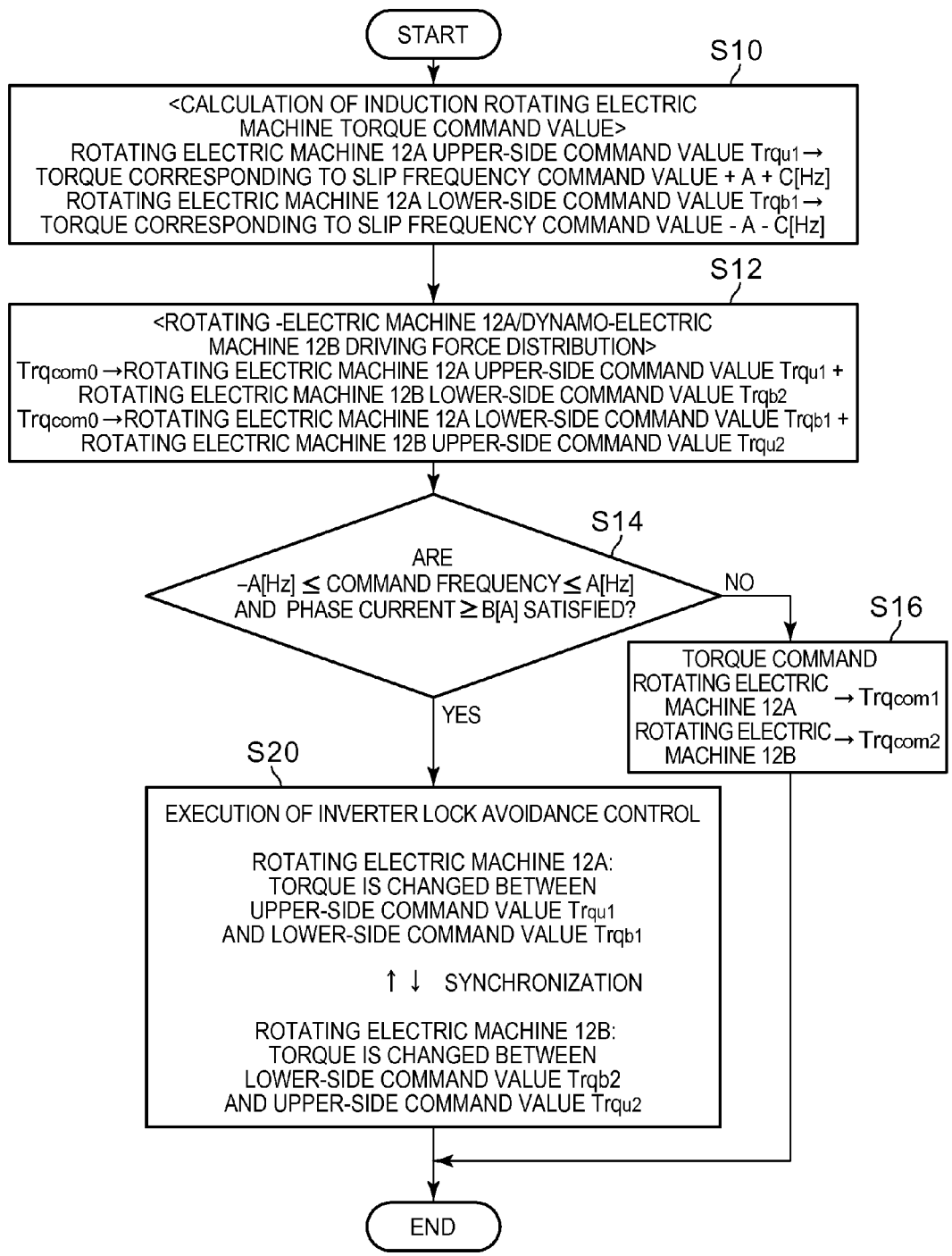

CONTROL DEVICE AND CONTROL METHOD FOR VEHICULAR ROTATING ELECTRIC MACHINE

INCORPORATION BY REFERENCE

The disclosure of Japanese Patent Application No. 2013 106953 filed on May 21, 2013 including the specification, drawings and abstract is incorporated herein by reference in its entirety.

BACKGROUND OF THE INVENTION

1. Field of the Invention

The invention relates to a control device and a control method for a plurality of rotating electric machines used as drive sources of a vehicle.

2. Description of Related Art

Conventionally, there are cases where a plurality of rotating electric machines are used as drive sources of a vehicle. For example, there are cases where a rotating electric machine for front-wheel drive and a rotating electric machine for rear-wheel drive are used. A torque command generated in accordance with the depression of an accelerator pedal or the like is distributed to each rotating electric machine. A command signal indicative of electric power supplied to each rotating electric machine is generated in accordance with the distributed torque command.

In addition, in the case where a direct current (DC) power source such as a battery or the like is used as the power source of the rotating electric machine, an inverter for converting DC power to alternating current (AC) power is used. The inverter performs DC/AC conversion in response to a command signal.

When the frequency of the command signal (command frequency) is low or 0 Hz, inverter lock in which a current flows to a specific switching element of the inverter for a long time period may occur. At this point, if a large current flows to the switching element, the switching element may be overheated.

The above state can occur at the time of start of a vehicle on an upward slope. In the case where an induction rotating electric machine is used, the frequency of the command signal to the rotating electric machine is the sum of a rotational frequency of a rotor and a slip frequency. When a stopped vehicle is caused to start on an upward slope, a driver releases a brake pedal and steps on an accelerator pedal. At this point, a positive torque command is outputted with depression of the accelerator pedal (the slip frequency: positive) while the vehicle slightly slides down on the upward slope with the release of the brake pedal (the rotational frequency: negative). As a result, part of all of the rotational frequency and the slip frequency cancel each other out, and the inverter lock may occur. In addition, at the time of start of the vehicle on the upward slope, there are cases where the depression of the accelerator pedal becomes relatively strong. With this, a large current flows to the switching element.

In order to reduce the overheat of the switching element, inverter protection control that reduces the current or voltage to the inverter when the flow of the large current to the switching element is detected is conventionally performed. For example, in Japanese Patent Application Publication No. 2007-259631 (JP 2007-259631 A), when the inverter lock state (a state in which an RPM becomes substantially zero) of a synchronous rotating electric machine is detected, electric power applied to the inverter is reduced. In addition, in Japanese Patent Application Publication No. 2012-228131 (JP 2012-228131 A), when the inverter lock state is detected, an inverter lock allowable time period during which the inverter lock state is allowed in accordance with the temperature of a coil of the rotating electric machine and an output torque value is calculated. Further, in Japanese Patent Application Publication No. 2005-354785 (JP 2005-354785 A), when the inverter lock state is detected, the current is distributed to the switching element on which the current is not concentrated.

Furthermore, in Japanese Patent Application Publication No. 8-289405 (JP 8-289405 A), the maximum value of the slip frequency to the induction rotating electric machine is changed in accordance with the temperature of a motor.

SUMMARY OF THE INVENTION

Incidentally, when the inverter protection control that reduces the voltage or current to the inverter is executed, the output torque of the rotating electric machine is reduced. When the torque is reduced at the time of the start on the upward slope described above, the start of the vehicle becomes different from the start thereof that the driver expects and drivability is thereby reduced. On the other hand, when the inverter protection control is disabled in spite of the fact that the inverter lock occurs and the large current flows, the inverter may be overheated. To cope with this, the invention provides a control device and a control method for a vehicular rotating electric machine that suppress a reduction in drivability at the time of the start on the upward slope as compared with the conventional art while preventing the overheat of the inverter.

A first aspect of the invention is a control device for at least a first rotating electric machine and a second rotating electric machine, and the control device includes an electronic control device configured to distribute a torque command based on a drive request of a driver to at least the first rotating electric machine and the second rotating electric machine, determine a slip frequency in accordance with the distributed torque command, and determine a command frequency from the slip frequency and a rotational frequency of the first rotating electric machine, and an inverter converting direct current power into alternating current power in accordance with the command frequency and supplying alternating current power obtained by converting direct current power into alternating current power to at least the first rotating electric machine and the second rotating electric machine. The electronic control device is configured to switch the command frequency to a frequency outside an inverter lock frequency band by changing the slip frequency when the command frequency is included in the inverter lock frequency band, and change the torque command to the second rotating electric machine other than the first rotating electric machine of which the slip frequency is changed such that a torque fluctuation caused by the change of the slip frequency is canceled out.

A second aspect of the invention is a control device for at least a first rotating electric machine and a second rotating electric machine, and the control device includes an electronic control device configured to distribute a torque command based on a drive request of a driver to at least the first rotating electric machine and the second rotating electric machine, determine a slip frequency in accordance with the distributed torque command, and determine a command frequency from the slip frequency and a rotational frequency of the first rotating electric machine, and an inverter converting direct current power into alternating current power in accordance with the command frequency and supplying alternating current power obtained by converting direct current power into alternating current power to at least the first rotating electric machine and the second rotating electric machine. The electronic control device is configured to fluctuate the slip frequency in a bandwidth wider than a bandwidth of an inverter lock frequency band when the command frequency is included in the inverter lock frequency band, and fluctuate the torque command to the second rotating electric machine other than the first rotating electric machine of which the slip frequency is fluctuated such that a torque fluctuation caused by the fluctuation of the slip frequency is canceled out. According to the above aspects, it becomes possible to suppress a reduction in drivability at the time of start on an upward slope or the like while preventing overheat of the inverter. In the above aspects, the first rotating electric machine may be an induction rotating electric machine, and the second rotating electric machine may be a synchronous rotating electric machine.

A third aspect of the invention is a control method for at least a first rotating electric machine and a second rotating electric machine, and the control method includes distributing, by an electronic control device, a torque command based on a drive request of a driver to at least the first rotating electric machine and the second rotating electric machine, determining, by the electronic control device, a slip frequency in accordance with the distributed torque command, determining, by the electronic control device, a command frequency from the slip frequency and a rotational frequency of the first rotating electric machine, converting direct current power into alternating current power in accordance with the command frequency and supplying alternating current power obtained converting direct current power into alternating current power to at least the first rotating electric machine and the second rotating electric machine by an inverter, switching, by the electronic control device, the command frequency to a frequency outside an inverter lock frequency band by changing the slip frequency when the command frequency is included in the inverter lock frequency band, and changing, by the electronic control device, the torque command to the second rotating electric machine other than the first rotating electric machine of which the slip frequency is changed such that a torque fluctuation caused by the change of the slip frequency is canceled out.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

each of FIGS. 3A, 3B, 3C, and 3D is a view for explaining inverter lock avoidance control;

FIG. 4 is a flowchart for explaining a determination flow of the inverter lock avoidance control;

each of FIGS. 5A, 5B, 5C, and 5D is a view for explaining the inverter lock avoidance control; and FIG. 6 is a flowchart for explaining the determination flow of the inverter lock avoidance control.

DETAILED DESCRIPTION OF EMBODIMENTS

Figure 1:
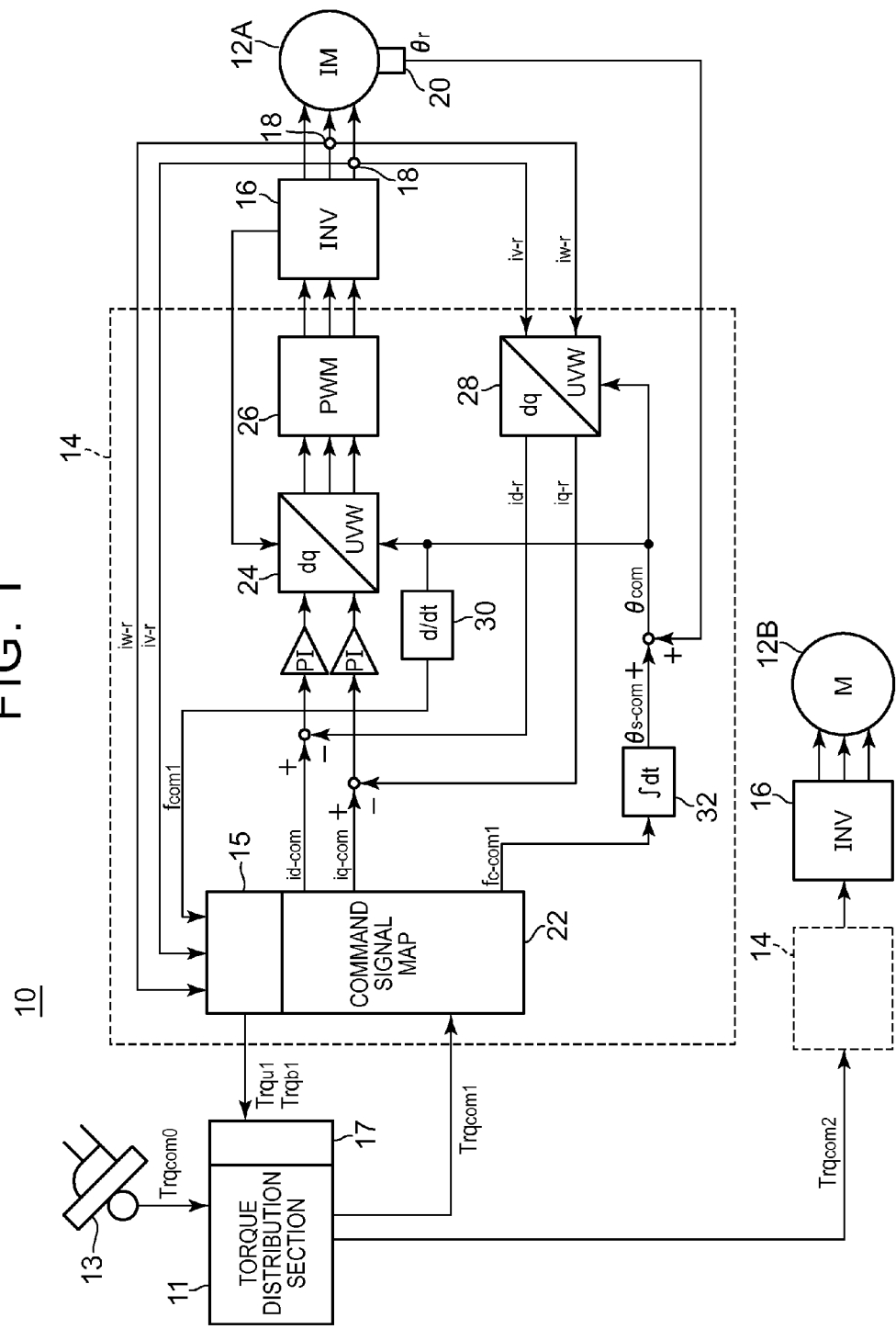
FIG. 1 is a block diagram including a control device for a rotating electric machine according to the present embodiment.

FIG. 1 is a block diagram including a control device 10 for a rotating electric machine and a plurality of rotating electric machines 12 to be controlled by the control device 10. FIG. 1 shows two rotating electric machines 12. One of the rotating electric machines 12A is an induction rotating electric machine such as, e.g., a three phase induction motor or the like. The other one of the rotating electric machines 12B may be the induction rotating electric machine or a synchronous rotating electric machine. Each of the rotating electric machines 12A and 12B is used as a drive source of a vehicle such as a hybrid vehicle or an electric vehicle. The rotating electric machine 12A is used as the drive source for rear wheel drive of the vehicle, while the rotating electric machine 12B is used as the drive source for front wheel drive of the vehicle.

The control device 10 includes a torque distribution section 11, a command calculation section 14, an inverter 16, a torque command change section 17, a current sensor 18, and a rotation phase detector 20. Note that, in the configuration described above, the components other than the torque distribution section 11 and the torque command change section 17 may be provided for each of the rotating electric machines 12A and 12B. The torque distribution section 11, the command calculation section 14, the torque command change section 17, the current sensor 18, and the rotation phase detector 20 are collectively referred to as an electronic control device. In FIG. 1, the depiction of the current sensor 18 and the rotation phase detector 20 on the side of the rotating electric machine 12B is omitted.

The inverter 16 is an electric power converter that converts direct current power into alternating current power (performs DC/AC conversion of electric power) in accordance with a command signal (a command amplitude and a command frequency) determined by the command calculation section 14, and supplies alternating current power (AC electric power) obtained by the conversion to the rotating electric machine 12. The inverter 16 receives direct current power (DC electric power) from a direct current power source (DC power source)(not shown) such as a battery and the like, and converts the DC electric power to the AC electric power corresponding to the command signal. The inverter 16 is, e.g., a three phase voltage inverter, and includes a switching element that is turned ON and OFF with a switching arm of each phase.

The current sensor 18 measures the value of a current supplied to the rotating electric machine 12 from the inverter 16. In the case where the rotating electric machine 12 is a three phase rotating electric machine, the current sensor 18 may be configured to measure currents of two phases. The sum of instantaneous values of three phase currents $i_u$, $i_v$, and $i_w$ is zero, if the currents of two phases can be detected, it is possible to calculate the current value of the remaining phase. In FIG. 1, a current measured value $i_{v-r}$ of a V phase and a current measured value $i_{w-r}$ of a W phase are acquired by the current sensor 18.

The rotation phase detector 20 detects a rotation phase $\theta_r$ of the rotating electric machine 12. The rotation phase detector 20 is configured by, e.g., a resolver or a Hall element, and a functional unit for calculating its measured value. The detection of the rotation phase $\theta_r$ is performed, e.g., in the following manner. An RPM$\omega_r$ of a rotor of the rotating electric machine 12 is acquired by the resolver or the Hall element, and the functional unit acquires an electrical angle frequency $f_r$ by calculation of (RPM/60)×(number of poles/2). By integrating the electrical angle frequency $f_r$, it is possible to obtain the rotation phase $\theta_r$ ($=2\pi f_r t + \theta_0$ wherein $\theta_0$ is the initial phase).

The torque distribution section 11 distributes a torque command value $Trq_{com0}$ based on a drive request of a driver to a plurality of the rotating electric machines 12. The torque command value $Trq_{com0}$ is calculated from, e.g., the depression amount (drive request) of an accelerator pedal 13 of a vehicle and the like by an electronic control unit (ECU) that is not shown. In addition, in the embodiment shown in FIG. 1, the torque distribution section 11 divides the received torque command value $Trq_{com0}$ into a torque command value $Trq_{com1}$ for the rotating electric machine 12A and a torque command value $Trq_{com2}$ for the rotating electric machine 12B. The torque distribution section 11 is configured to include an arithmetic circuit such as a microcomputer or the like, a random access memory (RAM), and a read only memory (ROM).

A distribution ratio used when the torque distribution section 11 divides the torque command value $Trq_{com0}$ into a plurality of the torque commands is determined in accordance with the operation state of the vehicle and the drive request. For example, when the front wheel slips, the distribution ratio for the rotating electric machine 12B for driving the front wheel is set to a low value, and the distribution ratio for the rotating electric machine 12A for driving the rear wheel is set to a high value.

The torque command change section 17 changes the torque command value distributed by the torque distribution section 11 when inverter lock avoidance control described later is executed. In FIG. 1, the torque distribution section 11 and the torque command change section 17 are shown as independent components. However, the torque command change section 17 may also be incorporated into the torque distribution section 11 as a part of an arithmetic circuit or storage means constituting the torque distribution section 11.

The command calculation section 14 outputs the command signal from the torque command value sent from the torque distribution section 11 to control the operation of the rotating electric machine 12. Similarly to the torque distribution section 11, the command calculation section 14 is configured to include the arithmetic circuit such as the microcomputer or the like and the storage means such as the RAM and the ROM.

The command calculation section 14 includes a frequency switching section 15, a map reference section 22, a two phase/three phase conversion section 24, a pulse width modulation (PWM) signal generation section 26, a three phase/two phase conversion section 28, and an integrator 32. Note that, in the case where the rotating electric machine 12 to be controlled is the synchronous rotating electric machine, the frequency switching section 15 and the integrator 32 may be omitted from the above configuration.

The two phase/three phase conversion section 24 converts differential values between command values (amplitudes) $i_{d-com}$ and $i_{q-com}$ of a d axis current and a q axis current outputted from the map reference section 22 and measured values (amplitudes) $i_{d-r}$ and $i_{q-r}$ of the d axis current and the q axis current sent from the current sensor 18 via the three phase/two phase conversion section 28 to command signals of three phases. The two phase/three phase conversion section 24 acquires a phase $\theta_{com}$ of the magnetic flux of the rotating electric machine 12A described later, and converts the command value from a dq coordinate system to a three phase coordinate system as a coordinate system at rest based on the phase $\theta_{com}$.

In addition, in the case where the inverter 16 is the voltage inverter, the differential values between the command values and the measured values of the d axis current and the q axis current are converted to voltage values using proportional integral processing (PI control processing) before the differential values are inputted to the two phase/three phase conversion section 24. The voltage values are converted to the voltage values of three phases by the two phase/three phase conversion section 24.

The PWM signal generation section 26 outputs PWM command signals corresponding to the command signals of three phases outputted from the two phase/three phase conversion section 24 to the inverter 16. For example, the PWM command signals in which the timing (duty ratio) of ON/OFF of the switching element of the inverter 16 is determined by comparing the command signals of three phases with carrier waves outputted from an oscillator (not shown) are outputted.

The three phase/two phase conversion section 28 converts three phase current measured values $i_{v-r}$ and $i_{w-r}$ acquired from the current sensor 18 and a U phase current value calculated from them to two phase current measured values $i_{d-r}$ and $i_{q-r}$. Herein, similarly to the two phase/three phase conversion section 24, the three phase/two phase conversion section 28 acquires the phase $\theta_{com}$ of the magnetic flux of the rotating electric machine 12, and performs conversion from the three phase coordinate system as the coordinate system at rest to the dq coordinate system based on the phase $\theta_{com}$.

The integrator 32 integrates a slip frequency command value $f_{s-com}$ outputted from the map reference section 22, and outputs a slip angle phase command value $\theta_{s-com}$ ($=2\pi f_{s-com}t + \theta_0$ wherein $\theta_0$ is the initial phase). Herein, the slip frequency command value $f_{s-com}$ is the electrical angle frequency ($=$mechanical angle frequency$\times$(number of poles/2)). The phase $\theta_{com}$ of the magnetic flux of the rotating electric machine 12 is calculated by adding the slip angle phase command value $\theta_{s-com}$ and the rotation phase $\theta_r$ acquired by the rotation phase detector 20. Note that, in the description shown below, a frequency component $f_{com}$ of the phase $\theta_{com}$ of the magnetic flux is referred to as a "command frequency".

The map reference section 22 outputs the command signal corresponding to the torque command value $Trq_{com}$ distributed to the rotating electric machine 12. The map reference section 22 determines amplitude command values $i_{d-com}$ and $i_{q-com}$ of the d axis current and the q axis current, and the slip frequency command value $f_{s-com}$ based on the received torque command value $Trq_{com}$ and a "command signal map".

Figure 2:
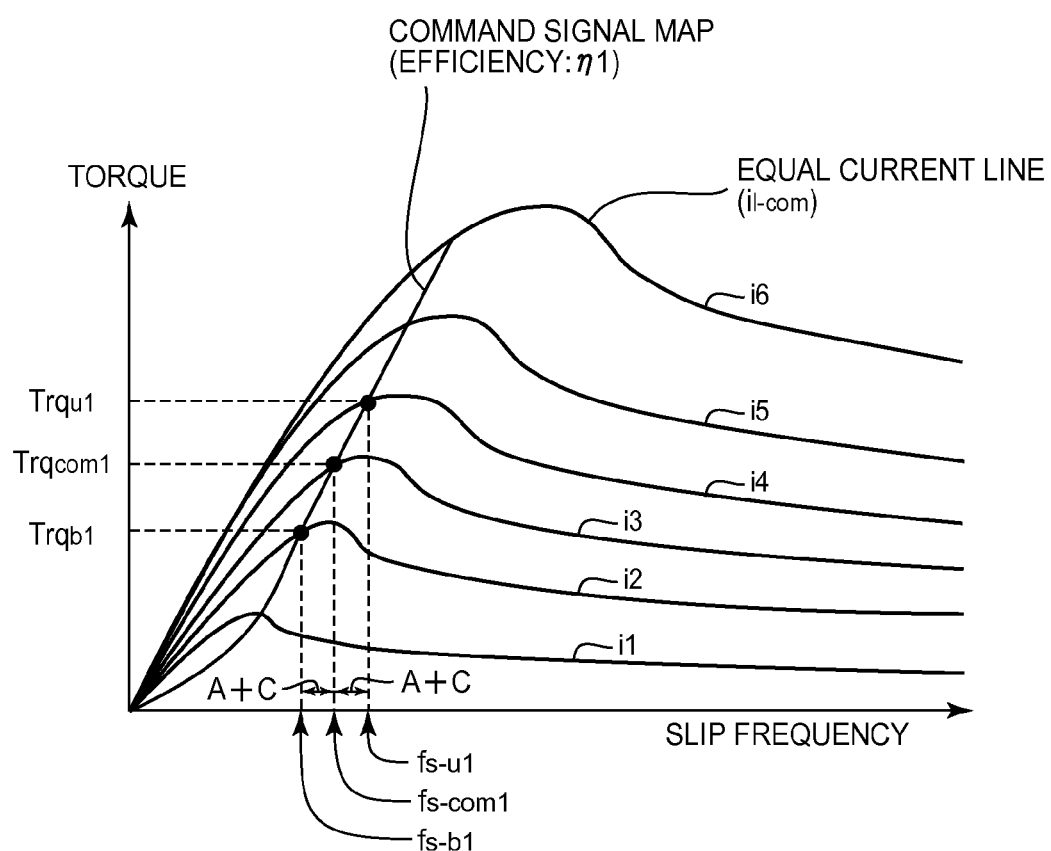
FIG. 2 is a view for explaining a command signal map.

The "command signal map" will be described. FIG. 2 shows a torque slip characteristic of the rotating electric machine 12A on a per current value basis. A curve that joins points having the same current value is referred to as an "equal current line". In the induction rotating electric machine 12, the output efficiency of the rotating electric machine 12 is changed according to the slip frequency.

Herein, a curve that joins predetermined output efficiency points on a plurality of the equal current lines is set. For example, a curve that joins the maximum output efficiencies $\eta_1$ on the individual equal current lines is set. In the present embodiment, the above mentioned curve is referred to as the "command signal map". The "command signal map" is stored in storage means (not shown) such as the ROM or the like in the form of a numerical formula or a table.

The map reference section 22 plots the torque command value $Trq_{com1}$ distributed to the rotating electric machine 12A on the vertical axis of FIG. 2 and extends it in parallel with the horizontal axis, and determines the point of intersection with the command signal map (the output efficiency $\eta_1$). By determining the point of intersection, it is possible to determine the slip frequency command value $f_{s-com}=f_{s-com1}$ and the current command value $i_{1-com}=i_3$ for outputting the torque command value $Trq_{com1}$ at the output efficiency $\eta_1$.

The current command value $i_{1-com}$ is a current value on the stator side (primary side) of the rotating electric machine 12, and is converted to the amplitude command values $i_{d-com}$ and $i_{q-com}$ of the d axis current and the q axis current through predetermined conversion processing. For example, in the case where the rotating electric machine 12 is vector controlled, the current command value $i_{1\text{-}com}$ is resolved into a torque current component and an exciting current component by using the slip frequency command value $f_{s\text{-}com}$, and the former is set as the command value $i_{q\text{-}com}$ of the q axis current and the latter is set as the command value $i_{d\text{-}com}$ of the d axis current. In addition, $i_{d\text{-}com}=i_{1\text{-}com}$ and $i_{q\text{-}com}=0$ may be set instead.

Returning to FIG. 1, during the inverter lock avoidance control, the frequency switching section 15 switches the command frequency $f_{com}$ to a frequency outside an inverter lock frequency band. In the embodiment shown in FIG. 1, although the frequency switching section 15 is shown as the component independent of the map reference section 22, the frequency switching section 15 may be incorporated into the map reference section 22.

The inverter lock avoidance control will be described. When the command frequency $f_{com}$ (the frequency component of the phase $\theta_{com}$ of the magnetic flux) obtained by adding the slip frequency command value $f_{s\text{-}com}$ and the rotational frequency $f_r$ of the rotating electric machine 12 is included in the inverter lock frequency band, and a large current is supplied to the switching element, i.e., when inverter protection control is about to be executed, the frequency switching section 15 switches the command frequency $f_{com}$ to the frequency outside the inverter lock frequency band. At this point, the torque command change section 17 changes the torque command of the rotating electric machine other than the rotating electric machine of which the command frequency $f_{com}$ is switched such that a torque fluctuation caused by the switching of the command frequency $f_{com}$ is canceled out.

The inverter lock denotes a state in which the command frequency $f_{com}$ is low or 0 Hz, and the current flows to the specific switching element of the inverter 16 for a long time period. The inverter lock frequency band denotes the frequency band that causes the inverter lock, and denotes, e.g., a range within ±10 Hz.

The command frequency $f_{com}$, can be obtained by differentiating the phase $\theta_{com}$ of the magnetic flux of the rotating electric machine 12 ($=2\pi f_{com}t+\theta_0$). The frequency switching section 15 acquires the command frequency $f_{com}$ from a differentiator 30 that differentiates the phase $\theta_{com}$, and also performs the inverter lock avoidance control in accordance with the value of the command frequency $f_{com}$.

The frequency switching section 15 switches the command frequency $f_{com}$ ($=f_{s\text{-}com}+f_r$) to the frequency outside the inverter lock frequency band by changing the slip frequency command value $f_{s\text{-}com}$ when the command frequency $f_{com}$ is included in the inverter lock frequency band. Note that it is assumed that each of the slip frequency command value $f_{s\text{-}com}$, the rotational frequency $f_r$ of the rotating electric machine 12, and the command frequency $f_{com}$ is the electrical angle frequency.

The change of the slip frequency command value $f_{s\text{-}com}$ is performed, e.g., in the following manner. If the rotating electric machine 12A is taken for example, the inverter lock frequency band is pre-set using the performance test of the rotating electric machine 12A or the inverter 16. In FIG. 2 and FIGS. 3A to 3D, the upper limit value of the inverter lock frequency band of the rotating electric machine 12A is represented by A[Hz], and the lower limit value thereof is represented by −A[Hz]. In addition, in FIG. 3A, the inverter lock frequency band is indicated by hatching of oblique lines.

Figure 3A:
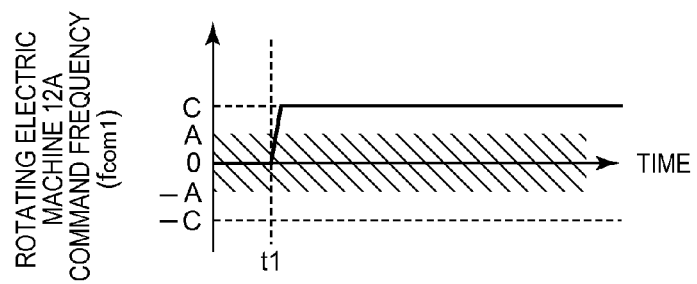
Figure 3B:
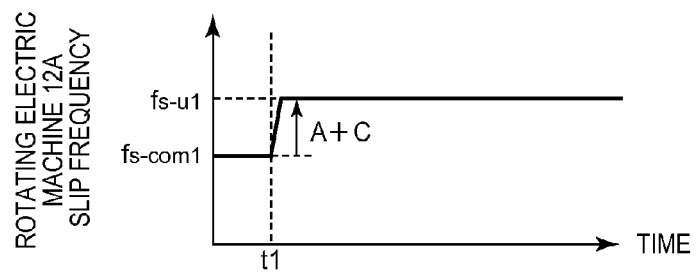

The frequency switching section 15 adds a margin value C[Hz] to the upper limit value A and the lower limit value −A, and adds these values to the present slip frequency command value $f_{s\text{-}com1}$. In FIG. 2, a value obtained by adding A+C[Hz] to the slip frequency command value $f_{s\text{-}com1}$ is used as an upper side slip frequency command value $f_{s\text{-}u1}$, and a value obtained by adding −A−C[Hz] to the slip frequency command value $f_{s\text{-}com1}$ is used as a lower side slip frequency command value $f_{s\text{-}b1}$. By switching the present slip frequency command value $f_{s\text{-}com1}$ to the upper side slip frequency command value $f_{s\text{-}u1}$ or the lower side slip frequency command value $f_{s\text{-}b1}$, it is possible to switch the command frequency $f_{com1}$ to the frequency outside the inverter lock frequency band. In FIG. 3B, the present slip frequency command value $f_{s\text{-}com1}$ is switched to the upper side slip frequency command value $f_{s\text{-}u1}$ at time t1.

In addition, as shown in FIG. 2, there are cases where the equal current line is changed with the shift of the slip frequency. For example, the current command value $i_{1\text{-}com}$ corresponding to the upper side slip frequency command value $f_{s\text{-}u1}$ is changed from $i_3$ to $i_4$. Further, the current command value $i_{1\text{-}com}$ corresponding to the lower side slip frequency command value $f_{s\text{-}b1}$ is changed from $i_3$ to $i_2$. Correspondingly to the current command value $i_{1\text{-}com}$ after the change, the amplitude command values $i_{d\text{-}com}$ and $i_{q\text{-}com}$ of the d axis current and the q axis current are also changed.

Figure 3C:
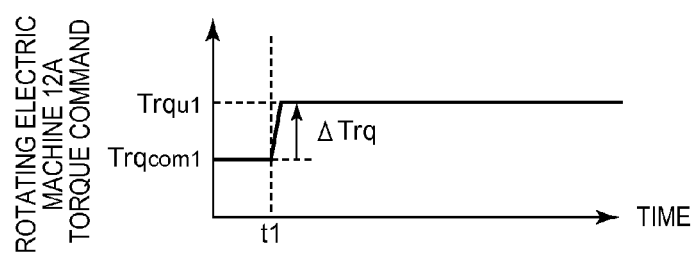

Further, by switching the slip frequency command value $f_{s\text{-}com1}$ of the rotating electric machine 12A to the upper side slip frequency command value $f_{s\text{-}u1}$ or the lower side slip frequency command value $f_{s\text{-}b1}$, as shown in FIG. 2 or a time chart of FIG. 3C, the torque command value of the rotating electric machine 12A is changed. Specifically, when the present slip frequency is switched to the upper side slip frequency command value $f_{s\text{-}u1}$, the torque command value becomes an upper side torque command value $Trq_{u1}$ larger than the torque command value $Trq_{com1}$ before the switching. When the present slip frequency is switched to the lower side slip frequency command value $f_{s\text{-}b1}$, the torque command value becomes a lower side torque command value $Trq_{b1}$ smaller than the torque command value $Trq_{com1}$ before the switching. In FIG. 3C, the torque command value $Trq_{com1}$ is changed to the upper side torque command value $Trq_{u1}$.

Figure 3D:
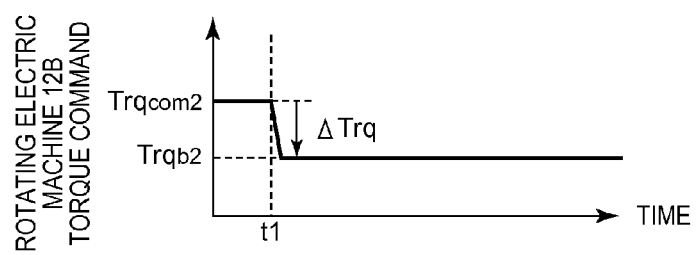

In order to cancel out the torque fluctuation caused by the switching of the slip frequency of the rotating electric machine 12A, the torque command change section 17 changes the torque command value $Trq_{com2}$ of the rotating electric machine 12B. For example, as shown in FIG. 3D, the torque command value $Trq_{com2}$ of the rotating electric machine 12B is reduced to a lower side torque command value $Trq_{b2}$. The lower side torque command value $Trq_{b2}$ may be a value obtained by, e.g., reducing the torque command value $Trq_{com2}$ of the rotating electric machine 12B by a torque increase portion $\Delta Trq$ of the rotating electric machine 12A ($Trq_{b2}=Trq_{com2}-\Delta Trq$).

In the above embodiment, although the torque fluctuation caused by the switching of the slip frequency of the rotating electric machine 12A is canceled out by one rotating electric machine, the invention is not limited to the embodiment. In the case where the torque fluctuation of the rotating electric machine 12A is canceled out by a plurality of the rotating electric machines, the torque increase portion $\Delta Trq$ of the rotating electric machine 12A may be divided into portions equally or according to normal outputs, and the portions may be used as torque decrease portions of the individual rotating electric machines.

Thus, in the present embodiment, by changing the slip frequency, the execution of the inverter protection control is avoided. In addition, by causing the other rotating electric machine 12B to cancel out the torque fluctuation of the rotating electric machine 12A caused by the change of the slip frequency, it becomes possible to prevent a reduction in drivability.

Note that the canceling out of the torque fluctuation in the present embodiment is not limited to the case where the difference between the torque fluctuation of the rotating electric machine of which the slip frequency is changed and the torque fluctuation of the other rotating electric machine becomes 0. For example, the difference that does not influence the drivability may be allowed. Specifically, the canceling out of the torque fluctuation in the present embodiment may include the case where the difference between the torque fluctuation of the rotating electric machine of which the slip frequency is changed and the torque fluctuation of the other rotating electric machine is less than 10% of the total requested torque of the entire rotating electric machines.

Next, a determination flow that determines whether or not the inverter lock avoidance control can be executed is shown as an example in FIG. 4. First, the map reference section 22 determines the slip frequency command value $f_{s-com1}$ from the torque command value $Trq_{com1}$ to the rotating electric machine 12A and the command signal map. Further, the map reference section 22 determines the upper side slip frequency command value $f_{s-u1}$ obtained by adding the frequency A+C [Hz] to the slip frequency command value $f_{s-com1}$, and the lower side frequency command value $f_{s-b1}$ obtained by subtracting the frequency A+C[Hz] (adding −A−C to) from the slip frequency command value $f_{s-com1}$.

The map reference section 22 determines the upper side torque command value $Trq_{u1}$ from the upper side slip frequency command value $f_{s-u1}$ and the command signal map. Similarly, the map reference section 22 determines the lower side torque command value $Trq_{b1}$ from the lower side slip frequency command value $f_{s-b1}$ and the command signal map (S10). The upper side torque command value $Trq_{u1}$ and the lower side torque command value $Trq_{b1}$ are sent to the torque command change section 17.

The torque command change section 17 determines the torque command value (the lower side torque command value $Trq_{b2}$) of the rotating electric machine 12B from the torque command value $Trq_{com0}$ determined from the depression amount of the accelerator pedal 13 and the like and the upper side torque command value $Trq_{u1}$ of the rotating electric machine 12A (S12). Similarly, the torque command change section 17 deter cines the torque command value (the upper side torque command value $Trq_{u2}$) of the rotating electric machine 12B from the torque command value $Trq_{com0}$ and the lower-side torque command value $Trq_{b1}$ of the rotating electric machine 12A.

Next, the frequency switching section 15 performs go/no go determination of the inverter lock avoidance control (S14). Specifically, the frequency switching section 15 performs the following two determination procedures. As a first determination procedure, the frequency switching section 15 determines whether or not the command frequency $f_{com1}$ to the rotating electric machine 12A is included in the inverter lock frequency band. As a second determination procedure, the frequency switching section 15 determines whether or not the current of the switching element sent to the rotating electric machine 12A is not less than a threshold value. Note that the second determination procedure may be omitted for the purpose of simplifying the flow.

During the inverter lock, the current flows to the specific switching element for a long time period. At this point, when the large current flows to the switching element, since the switching element is overheated, the inverter protection control is executed. That is, when (2) the large current flows to the specific switching element (1) for the long time period; the inverter protection control is executed. Based on this, even when (1) the current flows to the specific switching element for the long time period, (2)' if the current value is small, the inverter protection control is not executed. Accordingly, in the embodiment shown in FIG. 4, in the case where the value of the current flowing to the switching element is a small value that does not cause the overheat, the inverter lock avoidance control is not performed. Specifically, the frequency switching section 15 determines whether or not any one of the current measured values $i_{v-r}$ and $i_{w-r}$ acquired from the current sensor 18, and the current measured value $i_{u-r}$ of the U phase is not less than a predetermined threshold value.

In the case where at least one of the first and second determination procedure results indicates "no", it can be determined that the execution of the inverter protection control is not necessary. In this case, the frequency switching section 15 sends a signal indicating that the inverter lock avoidance control is not executed to the map reference section 22. The map reference section 22 performs calculation of the command signal to the rotating electric machine 12A based on the torque command value $Trg_{com1}$ sent from the torque distribution section 11 (S16). Similarly, the calculation of the command signal to the rotating electric machine 12B is performed based on the torque command value $Trq_{com2}$.

On the other hand, in the case where both of the first and second determination procedure results indicate "yes", the frequency switching section 15 executes the inverter lock avoidance control. That is, the frequency switching section 15 switches the slip frequency command value $f_{s-com1}$ to the upper side slip frequency command value $f_{s-u1}$ or the lower side slip frequency command value $f_{s-b1}$. In response to this, the map reference section 22 sends the torque command value corresponding to the slip frequency resulting from the switching, i.e., the upper side torque command value $Trq_{u1}$ or the lower side torque command value $Trq_{b1}$ to the torque command change section 17.

In the torque command change section 17, the torque command value that cancels out the torque fluctuation of the rotating electric machine 12A is set as the torque command value of the rotating electric machine 12B. That is, the torque command change section 17 selects the lower side torque command value $Trq_{b2}$ for the upper side torque command value $Trq_{u1}$ of the rotating electric machine 12A, and sets the lower side torque command value $Trq_{b2}$ as the torque command value of the rotating electric machine 12B. Alternatively, the torque command change section 17 selects the upper side torque command value $Trq_{u2}$ for the lower side torque command value $Trq_{b1}$ of the rotating electric machine 12A, and sets the upper side torque command value $Trq_{u2}$ as the torque command value of the rotating electric machine 12B (S18).

Note that, in the determination flow of FIG. 4, although the calculation of the upper side and lower side torque command values of the rotating electric machine 12A (S10) and the calculation of the upper side and lower side torque command values of the rotating electric machine 12B (S12) are performed before the go/no go determination of the inverter lock avoidance control (S14), step S10 and step S12 may be executed after the execution determination of the inverter lock avoidance control is performed in step S14.

Figure 5A:
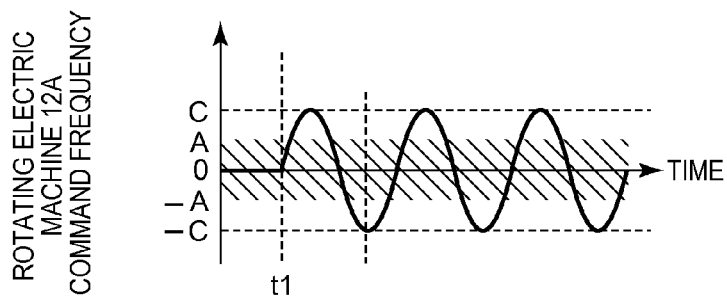
Figure 5B:
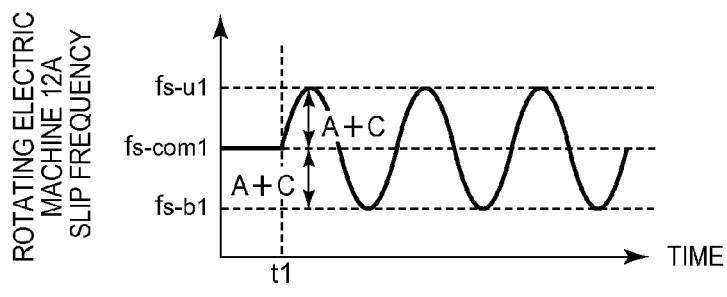

In FIGS. 5A to 5D, an example of the inverter lock avoidance control different from that in FIGS. 3A to 3D is shown. Herein, the frequency switching section 15 fluctuates the slip frequency command value in a bandwidth wider than the bandwidth of the inverter lock frequency band. In a time chart of FIG. 5B, the bandwidth of the slip frequency command value is set to 2 (A+C). With this, as shown in FIG. 5A, the command frequency can be moved out of the inverter lock frequency band periodically. When the command frequency is out of the inverter lock frequency band (when the AC frequency is increased), the current phase is changed and the current is distributed to the switching element other than the switching element on which the current is concentrated during the inverter lock. With the distribution of the current, the overheat of the switching element on which the current is concentrated is alleviated.

Figure 5C:
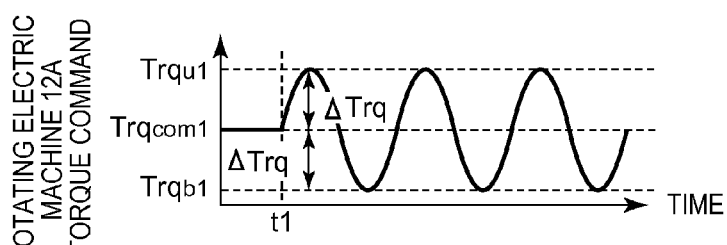
Figure 5D:
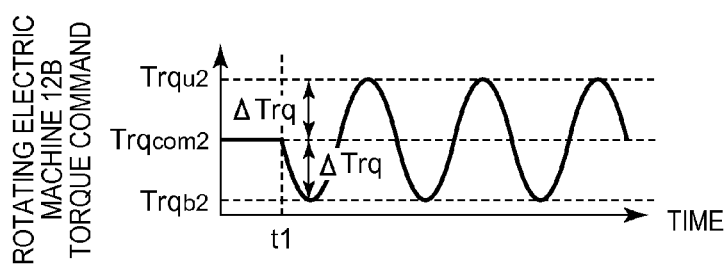

In addition, as shown in a time chart of FIG. 5C, with the fluctuation of the slip frequency, the torque command value of the rotating electric machine 12A is fluctuated. Accordingly, the torque command change section 17 fluctuates the torque command value of the rotating electric machine 12B such that the fluctuation of the torque command value of the rotating electric machine 12A is canceled out. For example, as shown in a time chart of FIG. 5D, the torque command change section 17 fluctuates the torque command value of the rotating electric machine 12B such that the fluctuation waveform of the torque command value of the rotating electric machine 12A is inverted.

FIG. 6 shows the determination flow based on FIGS. 5A to 5D that determines whether or not the inverter lock avoidance control can be executed. The determination flow in FIG. 6 is different from the determination flow of FIG. 4 in that the determination flow in FIG. 6 has step S20. When the execution of the inverter lock avoidance control is determined in step S14, the frequency switching section 15 fluctuates the slip frequency between the upper-side slip frequency command value $f_{s-u1}$ and the lower-side slip frequency command value $f_{s-b1}$. The map reference section 22 fluctuates the torque command value between the upper-side torque command value $Trq_{u1}$ and the lower-side torque command value $Trq_{b1}$ with the fluctuation of the slip frequency.

The torque command change section 17 fluctuates the torque command value between the lower-side torque command value $Trq_{b2}$ and the upper side torque command value $Trq_{u2}$ of the rotating electric machine 12B in synchronization with the fluctuation of the torque command value of the rotating electric machine 12A. With this, it becomes possible to avoid the activation of the inverter protection control while maintaining the torque of the rotating electric machine. In addition, the time when the large current flows is periodically intermitted with the fluctuation of the torque command, and hence it becomes possible to prevent the overheat of the inverter 16 on the side of the rotating electric machine 12B.

What is claimed is:

1. A control device for at least a first rotating electric machine and a second rotating electric machine, the control device comprising:
    an electronic control device configured to:
        (a) distribute a torque command based on a drive request of a driver to at least the first rotating electric machine and the second rotating electric machine,
        (b) determine a slip frequency in accordance with the distributed torque command, and
        (c) determine a command frequency from the slip frequency and a rotational frequency of the first rotating electric machine; and
    an inverter converting direct current power into alternating current power in accordance with the command frequency and supplying alternating current power obtained by converting direct current power into alternating current power to at least the first rotating electric machine and the second rotating electric machine,
    the electronic control device being configured to:
        (d) switch the command frequency to a frequency outside an inverter lock frequency band by changing the slip frequency when the command frequency is included in the inverter lock frequency band, and
        (e) change the torque command to the second rotating electric machine other than the first rotating electric machine of which the slip frequency is changed such that a torque fluctuation caused by the change of the slip frequency is canceled out.

2. The control device according to claim 1, wherein the first rotating electric machine is an induction rotating electric machine, and the second rotating electric machine is a synchronous rotating electric machine.

3. A control device for at least a first rotating electric machine and a second rotating electric machine, the control device comprising:
    an electronic control device configured to:
        (a) distribute a torque command based on a drive request of a driver to at least the first rotating electric machine and the second rotating electric machine,
        (b) determine a slip frequency in accordance with the distributed torque command, and
        (c) determine a command frequency from the slip frequency and a rotational frequency of the first rotating electric machines; and
    an inverter converting direct current power into alternating current power in accordance with the command frequency and supplying alternating current power obtained by converting direct current power into alternating current power to at least the first rotating electric machine and the second rotating electric machine,
    the electronic control device being configured to:
        (d) fluctuate the slip frequency in a bandwidth wider than a bandwidth of an inverter lock frequency band when the command frequency is included in the inverter lock frequency band, and
        (e) fluctuate the torque command to the second rotating electric machine other than the first rotating electric machine of which the slip frequency is fluctuated such that a torque fluctuation caused by the fluctuation of the slip frequency is canceled out.

4. The control device according to claim 3, wherein the first rotating electric machine is an induction rotating electric machine, and the second rotating electric machine is a synchronous rotating electric machine.

5. A control method for at least a first rotating electric machine and a second rotating electric machine, the control method comprising:
    (a) distributing, by an electronic control device, a torque command based on a drive request of a driver to at least the first rotating electric machine and the second rotating electric machine;
    (b) determining, by the electronic control device, a slip frequency in accordance with the distributed torque command;
    (c) determining, by the electronic control device, a command frequency from the slip frequency and a rotational frequency of the first rotating electric machine;
    (d) converting direct current power into alternating current power in accordance with the command frequency and supplying alternating current power obtained converting direct current power into alternating current power to at least the first rotating electric machine and the second rotating electric machine by an inverter;
    (e) switching, by the electronic control device, the command frequency to a frequency outside an inverter lock frequency band by changing the slip frequency when the command frequency is included in the inverter lock frequency band; and (f) changing, by the electronic control device, the torque command to the second rotating electric machine other than the first rotating electric machine of which the slip frequency is changed such that a torque fluctuation caused by the change of the slip frequency is canceled out.

* * * * *